(12) United States Patent
Shaikh et al.

(10) Patent No.: US 9,119,043 B2
(45) Date of Patent: Aug. 25, 2015

(54) APPARATUS AND METHOD FOR PROVIDING REMOTE COMMUNICATION OF AN ELECTRONIC DEVICE IN A COMMUNICATION NETWORK ENVIRONMENT

(71) Applicant: Samsung Electronics Co., Ltd., Gyeonggi-do (KR)

(72) Inventors: Asif Shaikh, Bangalore (IN); Nitesh Pushpak Shah, Bangalore (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 44 days.

(21) Appl. No.: 13/936,498

(22) Filed: Jul. 8, 2013

(65) Prior Publication Data

US 2014/0011477 A1 Jan. 9, 2014

(30) Foreign Application Priority Data

Jul. 6, 2012 (IN) .............................. 2745/CHE/2012
Jan. 10, 2013 (KR) ......................... 10-2013-0003020

(51) Int. Cl.
*H04W 4/12* (2009.01)
*H04W 4/14* (2009.01)
*H04L 29/08* (2006.01)
*H04W 4/00* (2009.01)
*H04W 92/18* (2009.01)

(52) U.S. Cl.
CPC ............... *H04W 4/14* (2013.01); *H04L 67/125* (2013.01); *H04W 4/001* (2013.01); *H04W 92/18* (2013.01)

(58) Field of Classification Search
CPC ...... G08C 17/00; G08C 23/04; H04L 67/125; H04W 4/001; H04W 4/14; H04W 92/18
See application file for complete search history.

(56) References Cited

U.S. PATENT DOCUMENTS

| 6,301,484 B1 | 10/2001 | Rogers et al. |
| 6,393,297 B1 | 5/2002 | Song |
| 6,662,023 B1 | 12/2003 | Helle |
| 6,697,421 B1 * | 2/2004 | Monroe et al. ................ 375/222 |
| 8,107,980 B2 * | 1/2012 | Jeong ............................ 455/466 |
| 2003/0036380 A1 * | 2/2003 | Skidmore ..................... 455/414 |

(Continued)

FOREIGN PATENT DOCUMENTS

| JP | 2009-111488 A | 5/2009 |
| WO | 2005/027548 A1 | 3/2005 |

OTHER PUBLICATIONS

"3rd Generation Partnership Project; Technical Specification Group Terminals; Use of Data Terminal Equipment—Data Circuit terminating; Equipment (DTE-DCE) interface for Short Message Service (SMS) and Cell Broadcast Service (CBS)"; May 1999; 3G TS 27.005 version 1.0.0; 3GPP.

(Continued)

*Primary Examiner* — Quan M Hua
(74) *Attorney, Agent, or Firm* — Cha & Reiter, LLC (57) ABSTRACT

A method and an apparatus conduct remote communication with an electronic device in a communication network environment, with the method including receiving a short message (SM) including an AT command from a controlling electronic device, analyzing and parsing the AT command for determining at least one task to be performed at the electronic device upon detecting that the SM is for a control operation, and performing the at least one task.

18 Claims, 6 Drawing Sheets

(56) References Cited

U.S. PATENT DOCUMENTS

2006/0095709 A1* 5/2006 Achiwa .................. 711/173
2006/0150119 A1* 7/2006 Chesnais et al. ............ 715/810
2007/0190995 A1  8/2007 Wang et al.
2010/0227605 A1  9/2010 Fournier

OTHER PUBLICATIONS

"3rd Generation Partnership Project; Technical Specification Group Terminals; AT command set for 3GPP User Equipment (UE)"; May 1999; 3G TS 27.007 version 1.0.0; 3GPP.

* cited by examiner

APPARATUS AND METHOD FOR PROVIDING REMOTE COMMUNICATION OF AN ELECTRONIC DEVICE IN A COMMUNICATION NETWORK ENVIRONMENT

CLAIM OF PRIORITY

This application claims, pursuant to 35 U.S.C. §119(a), priority to and the benefit of the earlier filing date of an Indian Provisional Patent Application filed in the India Patent Office on Jul. 6, 2012 which was assigned Serial No. 2745/CHE/2012, and a Korean Patent Application filed in the Korean Intellectual Property Office on Jan. 10, 2013 which was assigned Serial No. 10-2013-0003020, the entire contents of which are incorporated herein by reference.

BACKGROUND

1. Field of the Invention

The present disclosure relates to the field of wireless communications, and more particularly to an apparatus and the method for providing remote communication of an electronic device in a communication network environment.

2. Description of the Related Art

Wireless communication systems are evolving constantly. Designers are continuously developing a greater number of features for both network operators as well as for the end users. In the area of wireless phone systems, cellular based phone systems have advanced tremendously in the prior art. Electronic devices, being a genuine invention in the era of mankind, play a vital role even today to connect people at any corner of the world in a matter of seconds, or fetching information on the latest technology updates.

Some wireless communication systems comply with Third Generation Partnership Project (3GPP)/3GPP2 standards 27.007 and 27.005. The 3GPP/3GPP2 is collaboration between groups of telecommunications associations, known as the Organizational Partners. The initial scope of 3GPP was to implement a globally applicable third generation (3G) mobile phone system specification based on evolved Global System for Mobile Communications (GSM) specifications within the scope of the International Mobile Telecommunications-2000 project of the International Telecommunication Union (ITU). If a user wishes to control an electronic device using a computer, then the 3GPP/3GPP2 standards 27.007 and 27.005 may be used where attention (AT) commands are used to perform the control operation.

The AT command used in a modem device of a personal computer automatically recognizes and responds to the communication rate and a communication parameter between a data terminal equipment (DTE) and a Data circuit terminating equipment (DCE). The AT command is implemented such that the first two characters of the AT command are limited to "AT" or "at". "AT" generally refers to letters that get the attention of an electronic device. A computing device having communication capabilities may have a modem section for communicating signals with a communication line in order to send and receive a message for a Short Message Service (SMS) and a processing unit for executing AT commands such as a digital command signal (DCS) reception command for requesting reception of a DCS to the modem section. The electronic device includes a circuit called a Universal Asynchronous Receiver-Transmitter (UART), which receives the start and stop synchronous AT commands and proceeds to perform a communication in accordance with the received AT command. An automatic recognition method for measuring the timing and spacing of the start and stop bits is therefore needed to detect the rate of reception from the other side of the communication link, and to set a frequency of a baud rate for recognizing and responding to the communication rate and a communication parameter between DTE and a DCE. Further the serial communication unit of an external DTE device, such as a personal computer (PC), can communicate with the serial interface of an electronic device using a serial channel. The electronic device comprises an AT command module which is integrated into baseband chip of the electronic device and connected to the serial interface of the electronic device. This connection enables the AT command to perform various operations such as call services, SMS, supplementary services, GPRS data services, and various functions for controlling the electronic device such as operating a phonebook, obtaining an International Mobile Station Equipment Identity (IMEI), and so on.

As a way of performing a communication, a computer sends an AT command to an electronic device using a serial interface and controls the electronic device through the AT command, so as to implement the GSM/UMTS interaction. The user can operate or control the function configuration, such as call message Short Message Service (SMS) through the AT command. The AT command not only controls GSM related services such as call services, the SMS, supplementary services and GPRS data services, but also controls the functions of the electronic device, such as operating the phonebook, obtaining IMEI, etc. Thus it is easy for any user to take direct control of the electronic device without accessing the user interface device such as a keypad. The above communication is restricted to DCE and a DTE communication using the AT command, and is limited to a wired environment. Also, some of the existing methods control the remote electronic device using some specific commands that are predefined by the owner or user of the remote electronic device to control and operate the electronic device with wireless methods and communications.

Due to abovementioned reasons, it becomes clear that the existing methods control the electronic device using a computer or by using predefined commands to control and operate the remote electronic device. Further, a method to control and operate the remote electronic device, by wireless radio access communication employing existing AT commands, is needed.

SUMMARY

The present invention is to provide a method and apparatus for using the pre-defined 3GPP/3GPP2 standard (27.007 and 27.005) mobile commands (AT commands) for enabling communication between two remotely located electronic devices.

The present invention is also to provide a method and apparatus to create an AT command of an electronic device and send the command signal to a remote electronic device through a SMS.

In addition, the present invention is to provide a method and apparatus to provide security to access the electronic device from a remote location and restrict unauthorized access.

The present invention provides a method for remote communication of an electronic device in a communication network environment, and the method comprises receiving a short message (SM) including an AT command from a controlling electronic device, analyzing and parsing the AT command for determining at least one task to be performed at the electronic device on detecting that the SM is for a control operation, and performing the at least one task.

The present invention also provides an apparatus for remote communication of the electronic device in a communication network environment, wherein the apparatus comprises a short message module for receiving a short message (SM) including an attention (AT) command from a controlling electronic device to the specific electronic device; wherein the specific electronic device analyzes and parses the AT command for determining at least one task to be performed at the specific electronic device on detecting that the SM is for a control operation, and performs the at least one task.

These and other aspects of the exemplary embodiments of the present invention herein will be better appreciated and understood when considered in conjunction with the following description and the accompanying drawings. It should be understood, however, that the following descriptions, while indicating exemplary embodiments and numerous specific details thereof, are given by way of illustration only and not described as a limitation of the present invention. Many changes and modifications may be made within the scope of the exemplary embodiments herein without departing from the spirit thereof, and the exemplary embodiments herein include all such modifications.

BRIEF DESCRIPTION OF THE DRAWINGS

The present invention is illustrated in the accompanying drawings, throughout which like reference numerals and letters indicate corresponding parts in the various figures. The exemplary embodiments herein will be better understood from the following description with reference to the drawings, in which.

DETAILED DESCRIPTION

The exemplary embodiments herein of the present invention and the various features and advantageous details thereof are described more fully with reference to the non-limiting exemplary embodiments that are illustrated in the accompanying drawings and detailed in the following description. Descriptions of well-known components and processing techniques are omitted so as to not unnecessarily obscure the exemplary embodiments herein. The examples used herein are intended merely to facilitate an understanding of ways in which the exemplary embodiments herein can be practiced and to further enable those of skill in the art to practice the exemplary embodiments herein. Accordingly, the examples should not be construed as limiting the scope of the exemplary embodiments herein. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of the present invention may be employed in varied and numerous exemplary embodiments without departing from the scope of the present invention.

The same reference numbers are used throughout the drawings to refer to the same or like parts. Furthermore, although the drawings represent exemplary embodiments of the present invention, the drawings are not necessarily to scale and certain features may be exaggerated or omitted in order to more clearly illustrate and explain the present invention.

Among the terms set forth herein, a terminal, a mobile device, a portable device, or an electronic device refers to any kind of device capable of processing data which is transmitted or received to or from any external entity. The terminal, the mobile device, the portable device, or the electronic device may display icons or menus on a screen to which stored data and various executable functions are assigned or mapped. The terminal, the mobile device, the portable device, or the electronic device may include a computer, a notebook, a tablet PC, a cellphone, and any known type of electronic device.

Among the terms set forth herein, a screen refers to a display or other output devices which visually display information to the user, and which optionally may include a touch screen or touch panel capable of receiving and electronically processing tactile inputs from a user using a stylo, a finger of the user, or other techniques for conveying a user selection from the user to the display or to other output devices.

Among the terms set forth herein, an icon refers to a graphical element such as a figure or a symbol displayed on the screen of the electronic device such that a user can easily select a desired function or data. In particular, each icon has a mapping relation with any function being executable in the electronic device or with any data stored in the electronic device and is used for processing functions or selecting data in the electronic device. When a user selects one of the displayed icons, the electronic device identifies a particular function or data associated with the selected icon. Then the electronic device executes the identified function or displays the identified data.

Among the terms set forth herein, data refers to any kind of information processed by the electronic device, including text and/or images received from any external entities, messages transmitted or received, and information created when a specific function is executed by the electronic device.

The exemplary embodiments of the present invention herein achieve a method and apparatus to control a remote electronic device using AT commands which may be applied for versatile control applications usage on any electronic device. The method uses AT commands, as discussed in 3GPP/3GPP2 (27.007 and 27.005) and which are well-known in the art. The method uses generic commands that may be easily mapped or converted to a standard AT command internally and to re-use the existing functionality that is bound with the AT command to serve the purpose of a control application. Since the specification defines a standard for all AT commands which can be executed by an AT parser, the method generates and sends such AT commands from a controlling electronic device and performs a remote application task on a controlled electronic device which can be remotely located from the controlling electronic device. Another purpose of using the AT commands is its usage results in re-using the existing AT command library and its built-in functionality to serve any application purpose, instead of having an overhead of applying new functionalities.

Referring now to the drawings in FIGS. 1 through 6, where similar reference numerals refer to corresponding features consistently throughout the figures, there are shown exemplary embodiments of the present invention.

Figure 1:
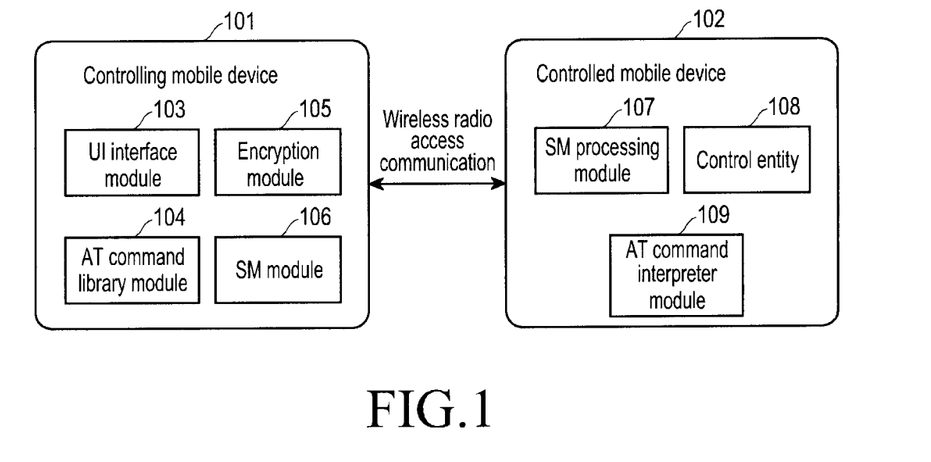
FIG. 1 illustrates a block diagram of two electronic devices according to exemplary embodiments of the present invention as disclosed herein.

FIG. 1 illustrates a block diagram of two electronic devices, according to the exemplary embodiments of the present invention as disclosed herein. As depicted in FIG. 1, the method controls an application such that such control extends between an electronic device, which may be local or remote to the user, and other remote electronic devices operating in a wireless environment.

In the exemplary embodiment, the electronic device described throughout the description herein may be a mobile phone, a PDA, a tablet and so on, having a processor, an input unit, a display unit, a memory, and a transceiver in a manner known in the art. For example, for wireless communications, the transceiver may include a transmitter, a receiver, and an antenna, and for wired communications, the transceiver may include a wire-based communications interface. In the exemplary embodiments described herein, the electronic devices implement wireless communications and therefore include known wireless components, but in alternative embodiments, wired communications as well as combinations of wired and wireless communications may also be implemented by the electronic devices to implement the present invention.

The electronic device which sends the AT command is referred to as a controlling electronic device 101 and the electronic device that receives the command is referred to as a controlled electronic device 102. The controlling electronic device 101 comprises several modules such as a user interface (UI) interface module 103, an AT command library module 104, an encryption module 105 and a short message (SM) module 106. The UI interface module 103 provides a display to the user of the controlling electronic device 101, for example, a screen, which may be a touch screen. The AT command library module 104 stores or accessed stored multiple AT commands, such as predetermined and/or known AT commands, which allows the controlling electronic device 101 to choose any AT command from the library to control and operate the controlled electronic device 102. The encryption module 105 in the controlling electronic device 101 provides security to send the AT command to the controlled electronic device 102. The encryption module 105 encrypts the outgoing AT command with a key to provide a secured communication between electronic devices 101, 102. The SM module 106 enables the controlling electronic device 101 to send the AT command to the controlled electronic device 102 through a short message service (SMS).

The user interface module 103 may optimally not display the AT commands to a user. Instead, AT commands are displayed in a plain-language format to a user through the display, controlled by the UI interface module 103, in the form of library keywords that are easily understandable in a predetermined natural language, such as English, Korean, Hindi, German, French, Italian, Spanish, etc., such as the English words and abbreviations CALL FWD, CALL END and so on.

The controlling electronic device 101 may transmit at least one control signal in the form of AT commands to the controlled electronic device 102 to elicit many types of responses, corresponding to the AT commands, from the receiving controlled electronic device 102. The controlling electronic device 101 sends the AT commands to the controlled electronic device 102 through wireless communication, such as radio waves in a manner known in the art. In the exemplary embodiment, communication link circuitry may advantageously be implemented as any known wireless radio access communication which has standardized special packets for transmitting digital signals such as a SMS transmission linked to the UMTS technology.

In another exemplary embodiment, the wireless radio access technology may be GSM, General Packet Radio Service (GPRS), LTE, CDMA and the like.

The controlled electronic device 102 comprises multiple modules such as a SM processing module 107, a control entity 108, and an AT command interpreter module 109. The controlled electronic device 102, upon receiving the SM from the controlling electronic device 101, processes the SM using the SM processing module 107. The control entity 108, which is connected to the SM processing module 107 and to the AT command interpreter or AT parser module 109, includes a storage module to store the user configured security key information to authenticate the user when accessing the controlled electronic device 102 from the controlling electronic device 101. The control entity 108 analyses the SM received from the controlling electronic device 101 and checks for user keyword information included in the SM. The user keyword information is pre-defined number N of bytes of ASCII characters to determine if the SM is a control SM or a normal user SM. The controlled electronic device 102 receives the AT command through the SMS and performs an operation or task using the AT command interpreter module 109. The AT command interpreter module 109 provides a response of an execution of the AT command embedded inside the SM, using the AT parser. In addition to or instead of placing a call or receiving a call, such a response may also change the status of the electronic device 102, such as activating circuitry in the electronic device 102 for receiving any information of the electronic device 101 or to control the electronic device 102.

In an alternative embodiment, the controlling electronic device 101 may also include such an SM processing module, control entity, and AT command interpreter module as in the controlled electronic device 102, so that the controlling electronic device 101 may, alternatively, be controlled by another electronic device implementing the components described herein for the controlling electronic device 101 as shown in FIG. 1.

Similarly, in another alternative embodiment, the controlled electronic device 102 may also include such a UI interface module, encryption module, AT command library module, and SM module as in controlling electronic device 101, so that the controlled electronic device 102 may, alternatively, control another electronic device implementing the components described herein for the controlled electronic device 102 as shown in FIG. 1.

Figure 2:
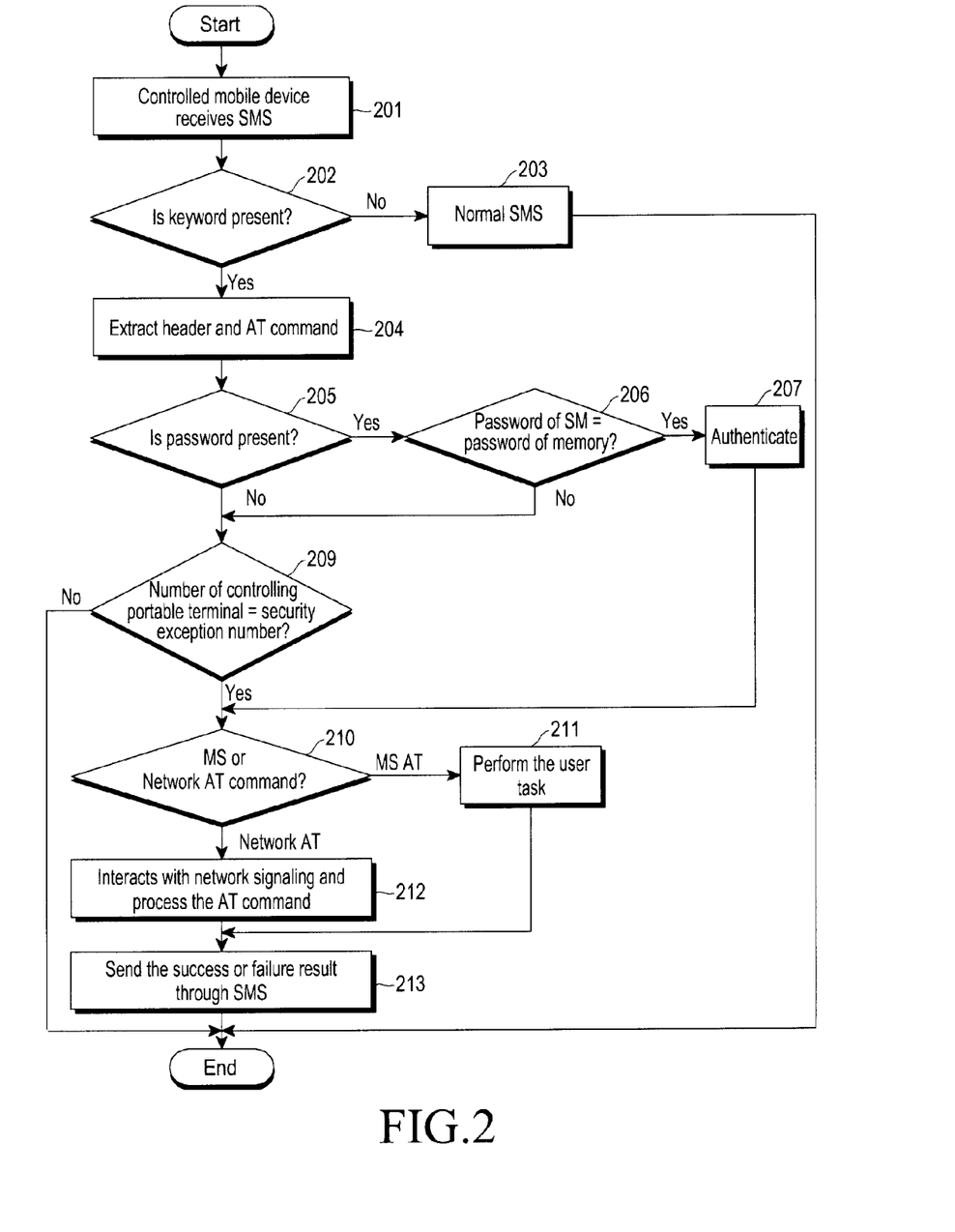
FIG. 2 illustrates the flow chart showing the steps involved in processing the AT command SM in the controlled electronic device according to the exemplary embodiments as disclosed herein.

FIG. 2 illustrates the flow chart showing the steps involved in processing a AT command SM in the controlled electronic device 102, according to exemplary embodiments as disclosed herein. As depicted in FIG. 2, the flow chart describes a method that checks the contents of the SM text which contains the control data and control information subjected to processing after being at the remotely placed controlled electronic device 102. The controlled electronic device 102 receives the SM from the controlling electronic device 101 through a SMS in step 201. On receiving the SM, the controlled electronic device 102 checks for any keyword in the SM in step 202. For example, the user or the electronic device 101 may start the SM text with the keyword "TO_MY_MOBILE" as a user defined keyword identifier which appears as part of the control information sent through the SMS. This keyword is used to distinguish a normal user SM from an AT command SM at the receiving end, with the AT command SM including or having embedded therein the AT command. Since both the AT commands and the SM are composed of text, the AT command may be easily inserted or embedded into an SM in a manner known in the art for creating and modifying SMs. If the user-defined keyword is not present in the SM, as determined in step 202, then the controlled electronic device sets the SM as a normal SM in step 203, and the method of FIG. 2 ends. Otherwise, if the user-defined keyword is present in the SM, as determined in step 202, the controlled electronic device extracts the AT command and, optionally, any header from the received SM in step 204. If the SM received by the controlled electronic device 102 is identified as an AT command SM, then the remaining part of the control information in the SM is processed further for verification such that the authenticity of the sender is verified by matching a password with stored passwords in the memory of the controlled electronic device 102. The controlled electronic device 102 checks for a password in the AT command in step 205. If a password is not found in step 205, the method proceeds to step 209. However, if a password is found in step 205, the method checks for a match of the password with the stored passwords in step 206. If no password match is found in step 206, the method proceeds to step 209. However, if a password match is found in step 206, then the controlled electronic device 102 authenticates the sender in step 207, and proceeds to step 210. Referring back to step 209, if the controlled electronic device 102 did not find any password in step 205 or did not find any password match in step 206, then the electronic device 102 checks if the SM is sent from a security exception number associated with the controlling electronic device 101 in step 209. If the SM was not sent from a security exception number in step 209, the method of FIG. 2 ends. Otherwise, if the SM was sent from a security exception number in step 209, the method proceeds to step 210. If the controlled electronic device 102 identifies the SM is sent from the security exception number, the authentication method of step 207 will not be performed. After successful authentication in step 207 or after step 210, the control information is executed by the AT command parser of the controlled electronic device 102 for generating a new task. The controlled electronic device 102 checks if the AT command is a mobile service (MS) AT command to be locally performed at the controlled electronic device 102, or a network AT command in step 210. If the AT command is a network AT command, then the new task generated interacts with the network and process the AT command in step 212, and proceeds to step 213. If the controlled electronic device 102 identifies that the AT command is a mobile AT command in step 210, then a new generated task will interact internally with the electronic device to perform the user task in step 211 for which the control information was intended by the controlling electronic device 101, and the method proceeds to step 213. In an alternative exemplary embodiment, the method may also a supplementary services (SS) string with the forwarded number to the network. Referring to step 213, the controlled electronic device 102 finally sends the success or failure result to the controlled electronic device 102 through the SMS in step 213. The various actions in the method of FIG. 2 may be performed in the order presented, in a different order, or simultaneously. Further, in some exemplary embodiments, some actions listed in FIG. 2 may be omitted.

In alternative exemplary embodiments, the controlling electronic device 101 may act as the controlled electronic device and receives the SM embedded with a AT command from any electronic device to perform control operations of the electronic device 101 which is then a controlled electronic device.

In another alternative exemplary embodiment, the controlled electronic device 102 acts as a controlling electronic device and sends the SM embedded with the AT command to any electronic device.

Figure 3:
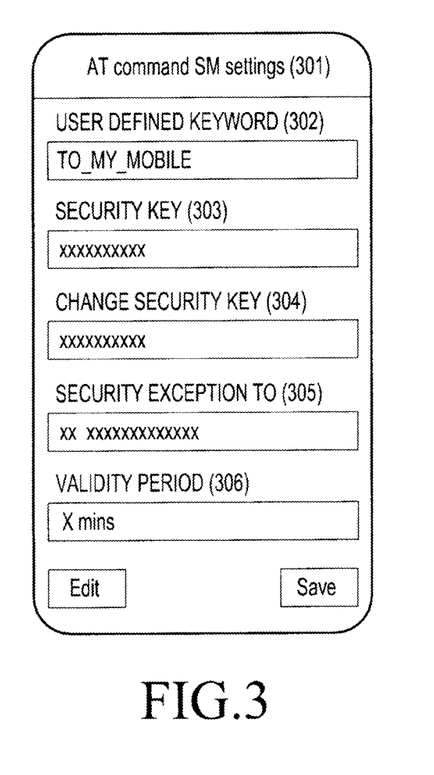
FIG. 3 illustrates a display screen of a controlled electronic device that is configured for the incoming AT command SM, according to the exemplary embodiments as disclosed herein.

FIG. 3 illustrates a display screen displayed by a controlled electronic device 102, as in FIG. 1, that is configured for the incoming AT command SM, according to the exemplary embodiments as disclosed herein. The AT command SM settings 301 are configured to receive and authenticate the AT command from the controlling electronic device 101. The settings are configured initially by the user, or alternatively may be default settings determined at the time of manufacture of the electronic devices 101, 102. The user defined keyword 302 refers to an input field used by the controlled electronic device 102 to identify that the incoming SM is a AT command SM. The input field 302 may be a field for receiving input text, such as letters, number, characters, and symbols, using an input unit, such as a touch screen of the electronic devices 101, 102, with the screen showing the settings 301 in a graphic user interface (GUI). The security key 303 is a password that the user configures in the controlled electronic device 102 for authentication purpose. In the exemplary embodiment, the user configures the security key as XXXXX then when user wants to send the AT command SM from another electronic device to access the electronic device of the user, which the user has left in his home or other remote location, then the user has to provide the same security key XXXXX for the remote electronic device, to be a controlled electronic device 102, for authentication. At any point of time, the user may change the security key by entering a new security key into a Change Security Key input field 304, for example, by pressing the Edit icon on the screen in FIG. 3. After configuring the electronic device, the user may save the configured AT command settings in the controlled electronic device 102 by pressing the Save icon on the screen in FIG. 3. In the exemplary embodiment of the present invention, there may be one option in the configuration settings in which the user may set an exception number 305 in the electronic device to avoid checking the security key, as described in connection with step 209 of FIG. 2. In the exemplary embodiment, the exception number 305 is stored in the memory of the controlled electronic device 102. This exception number may be a trusted number, and when the user sends the AT command from a controlling electronic device 101 which holds this exception number, then the SM received by the receiving controlled electronic device 102 will not check the sender, that is, the controlled electronic device 101, as the sender for security purposes. For example, the user configures his electronic device with a security exception number as XXXX in the input field 305 in FIG. 3. When the user wants to control his electronic device remotely as a controlled electronic device 102, then the user sends the AT command SM from the controlling electronic device 101, which holds the security exception number that the user has configured on his phone initially. When the user sends the AT command SM with the same security exception number XXXX, then his electronic device, as the controlled electronic device 102, will not check for the security key since the configured security exception number XXXX matched with the received security exception XXXX number matched with the mobile number of the sending or controlling electronic device 101. Such use of the exception number assists the user to send the AT command SM from any trusted remote electronic device as a controlling electronic device 102, which does not include the security information for authentication. In the exemplary embodiment, the controlling electronic device 101 sends an AT command SM to the controlled electronic device 102. In this case, the controlling electronic device 101 may be configured to only send the AT command SM to the controlled electronic device 102, and the controlled electronic device 102 may not execute any AT command when the controlled electronic device 102 receives any AT command SM from any electronic device other than the controlling electronic device 101.

The controlled electronic device 102 may also be configured to have a validity period, which is input into the input field 306 displayed on the screen of FIG. 3. The validity period in the validity period field 306 is a time duration, which may be measured in minutes or in other time units, that is configured by the user or is set by default by the manufacturer to accept a delay in receiving an AT command SM. The control entity 108 in the controlled electronic device 102 checks if the received AT command SM is received within the set validity time from the time that the AT command SM was sent by the controlling electronic device 101. The delay may be due to transmission delays of the network providing the communication channel between the electronic devices 101, 102 in FIG. 1, or may be due to processing delays of the controlling electronic device 101. In the exemplary embodiment, the validity period is stored in the memory of the controlled electronic device 102.

In another exemplary embodiment, due to some error in the network, the controlling electronic device 101 attempts to send the same message more than once, which may result in duplicates of the same AT command SM sent at least twice to the controlled electronic device 102. In this case, the controlling electronic device 101, when sending the SM to the controlled electronic device 102, includes a known Transfer Protocol-reject duplicate (TP-RD) information for identifying and rejecting or ignoring any occurrence of duplication of the same message at the Network Short Message Service Center (SMSC) providing the communication channel between the electronic devices 101, 102 in FIG. 1.

The control entity 108 of the controlled electronic device 102 checks the incoming AT command SM as having a format such as <Keyword><Header><Content>. The <Keyword> field is used by the electronic device to identify that the incoming SM is an AT command SM which is used for the control application.

The <Header> is a field used by the controlled electronic device 102 to verify the authenticity of the incoming SM. The <Header> field may be encrypted and included in the SM, for example, only at the time of sending the SM by the controlling electronic device 101. The header, which includes a security key 303 or password in FIG. 3, may cause the user to be prompted to input the security key 303 or password on a display of the controlling electronic device 101 using the UI interface module 103, only at the time of sending the SM through the SMS. Such prompting of the user is for the security concerns when reusing the same SM from an outbox of the controlling electronic device 10 after sending the SM for a first time. The <Content> field is used by the electronic device to include or embed the AT command which is used, when extracted, to control a remote mobile application in the controlled electronic device 102.

Figure 4:
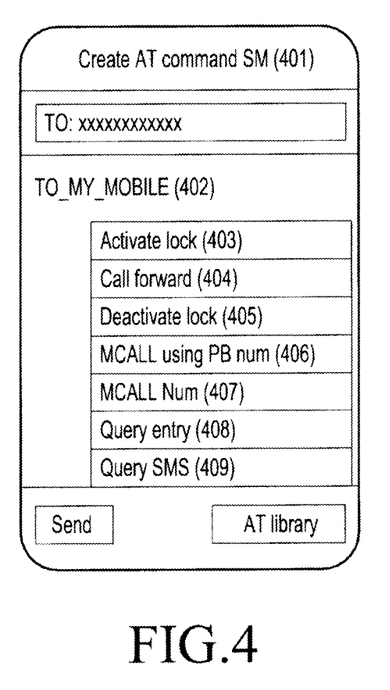
FIG. 4 illustrates a display screen of a controlling electronic device that uses an AT command library for creating and sending the AT command SM to the controlled electronic device, according to the exemplary embodiments as disclosed herein.

FIG. 4 illustrates a display screen displayed by a controlling electronic device 101, as in FIG. 1, that uses an AT command library for creating and sending an AT command SM to the controlled electronic device 102, according to the exemplary embodiments as disclosed herein. FIG. 4 depicts the controlling electronic device 101 that comprise an AT command library for the user to choose the AT command by choosing a corresponding plain-language text or keyword, and send the AT command to the controlled electronic device 102. The controlling electronic device 101 may create the AT command SM 401 from the user input of the number to which the particular AT command SM should be sent. The user using the controlling electronic device 101 inputs the keyword 402 in the input field after "TO:", and plurality of AT command options is then displayed instantly from the AT library in a memory accessed by the AT command library module 104 in FIG. 1.

The user enters the keyword "TO_MY_MOBILE" 402 in the displayed input field after "TO" using the GUI and/or the touch screen of the controlling electronic device 101, and the AT command library module 104 causes the screen in FIG. 4 to display the plurality of AT commands options to the user. The AT command library module 104 causes the screen in FIG. 4 to display, for example, an activate lock option 403 to lock the controlled electronic device 102 from unauthorized usage by any person.

The user selects the activate lock option 403, and then the AT command corresponding to that option will be sent to the controlled electronic device 102 in an SM through the SMS.

The user selects the call forwarding option 404, and then the corresponding AT command will be sent to the controlled electronic device 102 for call forwarding. By this option, the user may forward the calls to any other electronic device including the controlling electronic device 101.

The user may select any displayed or available option from the AT command library, and the controlling electronic device 101 may search for an AT command corresponding to the user selected option. When the user selects the send command or option, by tapping or activating a Send icon on the screen as shown in FIG. 4, the controlling electronic device 101 includes the AT command of the selected option in a generated SM, and sends the SM through the SMS to the controlled electronic device 102.

If the user wants to forward the call to a new electronic device, the user selects the call forwarding option 404, and inputs and sends the number of a new electronic device to which the call is to be forwarded. The UI interface module 103 may generate and cause the display of another screen or a pop-up window, or alter the screen in FIG. 4 to display an input field to allow the user to input the number of the new electronic device, which is inserted into the SM message with the AT command for call forwarding. Then the AT command which corresponds to call forwarding will be sent to the controlled electronic device 102. The controlled electronic device 102 will then extract the number of the new electronic device, and forward any future calls for the user to the inputted number of the new electronic device sent by the controlling electronic device 101. Now, the new electronic device receives the calls that are coming to the controlled electronic device 102 but which are forwarded to the specified new electronic device.

The user selects the deactivate lock option 405 from the AT command library, which allows the user to deactivate any lock that the user has activated in his remote electronic device as a controlled electronic device 102.

The user selects the MCALL using a Phone Book number (PB num) option 406. This allows the user to remotely call a person in the remote mobile phonebook (PB) by sending the corresponding AT command in an SM to the controlled electronic device 102 through the SMS.

The user selects the MCALL number (Num) option 407 from the AT command library. This allows the user to remotely call a number using his remote electronic device as the controlled electronic device 102.

The user selects the Query entry option 408 in the AT command library, if the user wants to access the Internet from his remote electronic device as the controlled electronic device 102, and if user wants all queries related to the user authentication to be redirected to the current electronic device that the user is using as the controlling electronic device 101.

The user selects the Query SMS option 409 in the AT command library. For example, if the user registers in any Internet account, he may get a confirmation through the SMS for authentication. If the user wants that confirmation to be sent to the current electronic device that the user is using as the controlling electronic device 101, then the user selects the query SMS option 409 in the AT command library.

Further AT commands may be included in the options shown in the display screen of FIG. 4, such as the option to allow the user to perform an Internet banking transaction using a computer or other electronic device as a controlling electronic device 101 which controls a remote electronic device of the user as a controlled electronic device 102. To authenticate the user, the bank will send the SM to the mobile number that the user registered initially. In the event that the user might have left his electronic device in his home, to proceed with the Internet banking transactions, the user needs to provide the security key in the SM. At this time, the user may choose Query SMS option 409, and the controlling electronic device 101 will send the AT command to the controlled electronic device 102 that receives the SM containing the authentication information for banking transactions. Then the controlled electronic device 102, upon receiving the AT command SM, will send the Internet banking authentication SM to the controlling electronic device 101 that the user used to send the AT command SM.

In addition, the screen shown in FIG. 4 may also include an AT Library icon, allowing the user to change to another AT library, list, or menu of AT commands, to be displayed on the screen of FIG. 4.

Figure 5:
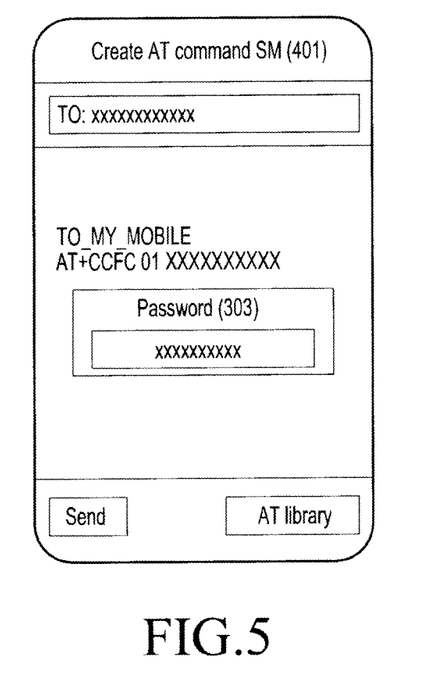
FIG. 5 illustrates a display screen of a controlling electronic device that sends the call forwarding AT command to the controlled electronic device with a password included in the SM, according to the exemplary embodiments as disclosed herein.

FIG. 5 illustrates a display screen displayed by a controlling electronic device 101 that sends the call forwarding AT command to the controlled electronic device with a password included in the SM, according to the exemplary embodiments as disclosed herein. When the user selects the call forwarding option 404 from the AT command library, as shown in FIG. 4, then the controlling electronic device 101 chooses the corresponding AT command corresponding to the call forwarding option. Further, the controlling electronic device 101, using the UI interface module 103 controlling the screen, generates a pop-up window or screen with an input field which prompts the user to input the password 303 or security key that was initially configured in the controlled electronic device 102. Once the user enters the password 303, he may press the Send icon in FIG. 5 to send the AT command SM through SMS for call forwarding to the controlled electronic device 102.

Figure 6:
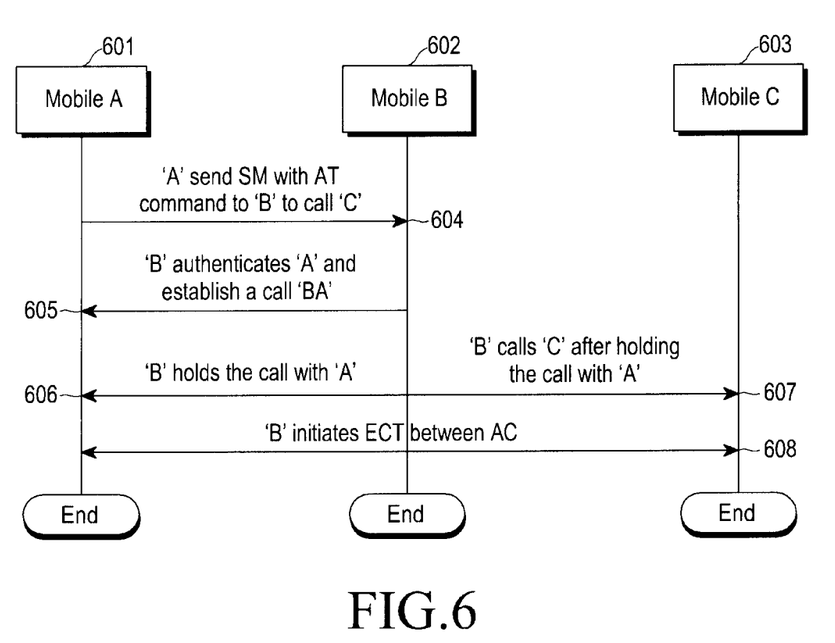
FIG. 6 illustrates the remote calling process, according to the exemplary embodiments as disclosed herein.

FIG. 6 illustrates the remote calling process, according to the exemplary embodiments as disclosed herein. For example, the user with an electronic device 601, labeled A, may want to communicate with the electronic device 603, labeled C, using his remote electronic device 602, labeled B, which has lower call charges. The user with the electronic device A 601, as a controlling mobile device, first sends the AT command SM in step 604 to controlled electronic device B 602 through the SMS. After receiving the SM, the controlled electronic device B 602 authenticates the user of the controlling electronic device A 601. After successful authentication of the controlling electronic device A 601, the controlled electronic device B 602 initiates two mobile originating calls and connects the controlling electronic device A 601 with the electronic device C 603. Then, the controlled electronic device B 602 first establishes a call BA in step 605 with the electronic device A 601. Now, the controlling electronic device A 601 and the controlled electronic device 602 are connected on the call BA. In the second step, the controlled electronic device 602 holds the call BA with the controlling electronic device A 601 in step 606. The controlled electronic device B 602 puts the call BA on Hold in step 606. In the third step, the controlled electronic device B 602 calls the electronic device C device 603 in step 607 while the call BA is still on hold. Now, the remote electronic device B 602 and the electronic device C 603 are connected on a call BC.

Finally, the controlled electronic B 602 initiates an Explicit Call Transfer (ECT) between the calls BA and BC in step 608. Explicit call transfer (ECT) is one of the features of a multi-party call where an electronic device connects to an active call with the on-hold call and disconnects itself from the call. Now after the ECT, the electronic device A 601 is directly connected with the electronic device C 603 in the call AC, which completes the purpose of calling the electronic device C by remotely using the electronic device B, which has low call charges. Alternatively, the electronic device B may be used to initiate the call AC between the electronic device A 601 and the electronic device C 603 for security, anonymity, or accessing proposes, for example, to prevent the electronic device C 603 from blocking the electronic device A 601.

The electronic devices 601-603 may be located in different locations or different countries. By this arrangement, a user with an electronic device A 601 in country X may want to call the mobile device C 603 in country Y using the remote electronic device B 602 in country Z. Also, the call charges associated with the remote device B 602 may be less expensive for standard or international calls. Hence, the user with the electronic device A 601 may call to the electronic device C 603 using the remote electronic device B 602 which has less expensive call charges for standard and international calls.

The exemplary embodiments of the present invention disclosed herein can be implemented through at least one software program running on at least one hardware device and performing network management functions to control the elements and components of the various electronic devices. The elements and components shown in FIG. 1 includes blocks which can be at least one of a hardware device, or a combination of a hardware device and a software module.

The above-described apparatus and methods according to the present invention can be implemented in hardware or firmware, or as software or computer code, or combinations thereof. Various components such as a controller, a central processing unit (CPU), a processor, and any unit or device described herein includes at least hardware and/or other physical structures and elements. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

The foregoing description of the specific exemplary embodiments will so fully reveal the general nature of the exemplary embodiments herein that others can, by applying any technical knowledge, readily modify and/or adapt for various applications such specific exemplary embodiments without departing from the generic aspects of the present invention, and, therefore, such adaptations and modifications should and are intended to be comprehended within the meaning and range of equivalents of the disclosed exemplary embodiments. It is to be understood that the phraseology or terminology employed herein is for the purpose of description and not for limitation. Therefore, while the exemplary embodiments herein have been described in terms of example implementations, those skilled in the art will recognize that the exemplary embodiments herein can be practiced with modification within the spirit and scope of the present invention as described herein.

What is claimed is:

1. A method for providing remote communication with an electronic device in a communication network environment, the method comprises:
   receiving a short message (SM) including an attention (AT) command from a controlling electronic device;
   analyzing and parsing the AT command for determining at least one task to be performed at the electronic device on detecting that the SM is for a control operation in which control of an application extends from the controlling electronic device to the electronic device;
   checking whether a password associated with the AT command in the received SM is present;
   if the password is present the received SM, checking whether a number of the controlling electronic device that sent the SM is same as a security exception number; and
   if the number is same as the security exception number, performing the at least one task at the electronic device.

2. The method as in claim 1, further comprising displaying one or more plain language keywords including a user pre-defined identifier for indicating a message for a remote control process for indicating the at least one task.

3. The method as in claim 1, wherein the controlling electronic device sends the SM to the electronic device through a Short Message Service (SMS).

4. The method as in claim 1, wherein the AT command is predefined in an AT library of the controlling electronic device.

5. The method as in claim 4, wherein the SM includes the AT command corresponding to an input selecting the AT command from the AT library in the controlling electronic device.

6. The method as in claim 1, wherein the SM includes an authentication element.

7. The method as claimed in claim 6, wherein the authentication element is at least one of a password and an authentication exception number stored in the electronic device.

8. The method as in claim 1, wherein the SM includes Transfer Protocol-reject duplicate (TP-RD) information for identifying and rejecting any occurrence of duplication of a same SM.

9. An electronic device for providing remote communication in a communication network environment, the electronic device comprising:
   a short message module is configured to include a transmitter and a receiver for wirelessly receiving a short message (SM) including an attention (AT) command from a controlling electronic device to the electronic device; and
   a processor configured to:
   analyze and to parse the AT command for determining at least one task to be performed at the electronic device on detecting that the SM is for a control operation in which control of an application extends from the controlling electronic device to the electronic device;
   to check whether a password associated with AT command in the received SM is present;
   if the password is present the received SM, checking whether a number of the controlling electronic device that sent the SM is same as a security exception number; and
   if the number is same as the security exception number, to perform the at least one task.

10. The electronic device as in claim 9, further comprising a display displaying one or more plain language library keywords including a user pre-defined keyword identifier for indicating a message for a remote control process, and for indicating the at least one task.

11. The electronic device as in claim 9, wherein the AT command is predefined in an AT library of the controlling electronic device.

12. The electronic device as in claim 9, wherein the electronic device determines whether the SM is related to the control operation by comparing a user pre-defined keyword identifier in the SM with a keyword pre-stored in the electronic device.

13. The electronic device as in claim 9, wherein the electronic device authenticates the SM before parsing the SM.

14. The electronic device as in claim 13, wherein the electronic device authenticates the SM using at least one of a password and an authentication exception number pre-stored in the electronic device.

15. The electronic device as in claim 9, wherein the electronic device ignores the SM, when a difference between a transmitting time of the SM of the controlling electronic device and a receiving time of the SM of the electronic device exceeds a pre-defined validity period.

16. The electronic device as in claim 9, wherein the electronic device further comprises a memory for storing a user pre-defined keyword identifier, a password, an authentication exception number and a validity period.

17. The electronic device as in claim 9, wherein the electronic device sends a status response including an operation result of the at least one task to the controlling electronic device.

18. The electronic device as in claim 9, wherein the short message module sends the SM to the electronic device through a Short Message Service (SMS).

* * * * *